(12) United States Patent
McAlinden

(10) Patent No.: US 6,751,307 B2
(45) Date of Patent: Jun. 15, 2004

(54) DELIVERING CALLS USING CALENDAR INFORMATION

(75) Inventor: Paul McAlinden, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 09/899,685

(22) Filed: Jul. 5, 2001

(65) Prior Publication Data

US 2003/0007617 A1 Jan. 9, 2003

(51) Int. Cl.[7] .................. H04M 3/42; H04M 3/432; H04M 3/436; H04M 3/46
(52) U.S. Cl. ............ 379/201.02; 379/196; 379/211.02; 379/909; 379/207.15
(58) Field of Search .................. 379/93.23, 201.01, 379/201.02, 201.07, 201.08, 207.03, 210.01, 211.02, 909, 196, 197, 198, 207.15; 345/963

(56) References Cited

U.S. PATENT DOCUMENTS

| | | | | | |
|---|---|---|---|---|---|
| 4,277,649 | A | * | 7/1981 | Sheinbein ............... | 379/211.02 |
| 5,428,678 | A | * | 6/1995 | Fitzpatrick et al. .... | 379/201.02 |
| 5,493,692 | A | * | 2/1996 | Theimer et al. ............ | 455/26.1 |
| 5,872,841 | A | * | 2/1999 | King et al. ............ | 379/210.01 |
| 6,373,817 | B1 | * | 4/2002 | Kung et al. ............... | 370/217 |
| 6,477,374 | B1 | * | 11/2002 | Shaffer et al. .............. | 455/445 |

* cited by examiner

Primary Examiner—Harry S. Hong
(74) Attorney, Agent, or Firm—Trop, Pruner & Hu, P.C.

(57) ABSTRACT

A call routing function may receive information from a user profile about how to handle a telephone call. In addition, the call routing function may also receive information about what the user is currently involved in doing. This information may be derived from the user's software-based calendar. Using both sources of information, a call may automatically be appropriately routed by the call routing function.

22 Claims, 3 Drawing Sheets

DELIVERING CALLS USING CALENDAR INFORMATION

BACKGROUND

This invention relates generally to delivering telephone calls based on user supplied profiles or parameters.

A telephone can incorporate a profile feature to customize how calls from certain callers will be handled in given situations. An example would be that a call from a particular person might cause the user's phone to beep during a meeting, while a call from an unknown individual may be sent to voice mail in the same situation.

The use of the profile feature may enable the user to predetermine how particular calls may be handled. Moreover, calls may be commonly handled in an automated fashion. This increases the ability of the user to manage his or her calls.

Generally, the profile feature cannot determine where the user is at any given time or why the user is not answering his or her phone. Thus, a profile feature merely serves out instructions based on predetermined profile settings supplied by the user. In some cases, the user may fail to update status information. For example, the user may set his telephone on forward to a personal assistant while the user attends a meeting. But then when the user exits from the meeting, the user may forget to redefine his or her user profile. As a result, the user's calls continue to get forwarded to the personal assistant even though the user may now be available.

Thus, there is a need for ways to further automate the handling of telephone calls.

DETAILED DESCRIPTION

Figure 1:
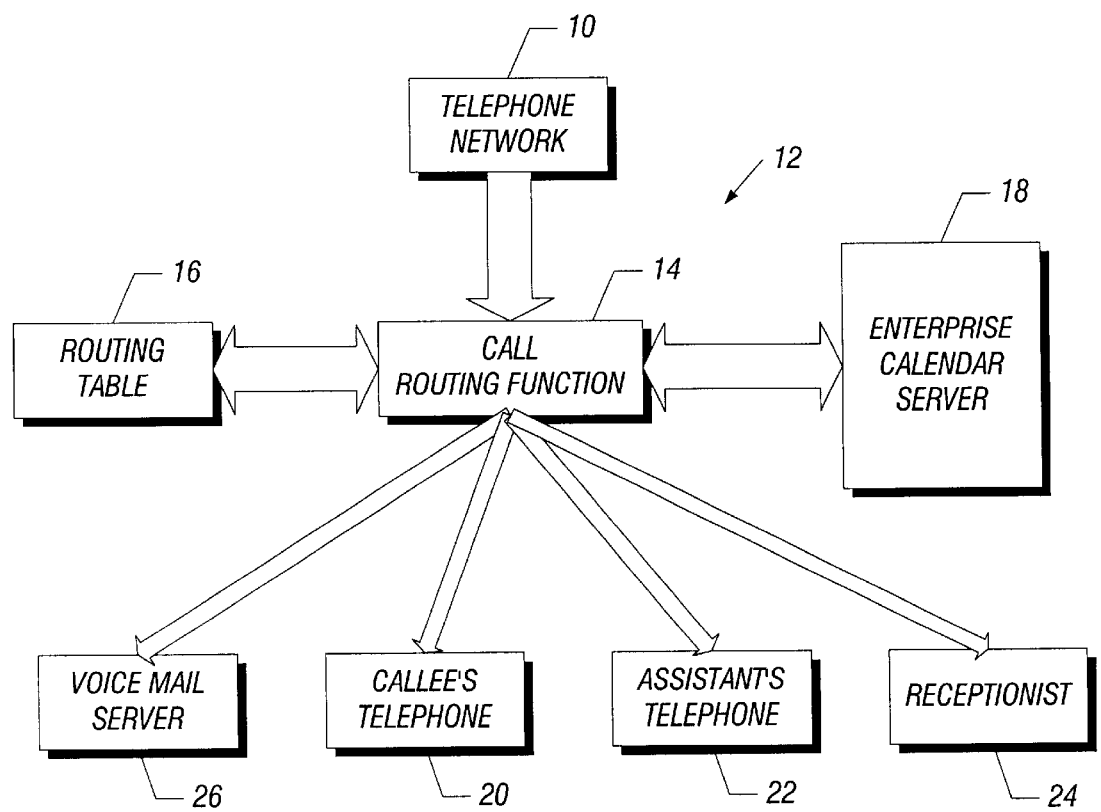
FIG. 1 is a schematic depiction of one embodiment of the present invention.

Referring to FIG. 1, a call handling system 12 may be coupled to a telephone network 10. In one embodiment, the call handling system 12 may be part of a cellular telephone and the network 10 may be a cellular telephone network. As another embodiment, the call handling system 12 may be part of a land line phone system. As still another alternative, the call handling system 12 may be part of an enterprise or corporate telephone system. As still another alternative, the call handling system 12 may be part of an enterprise software solution.

The call handling system 12 may include a call routing function 14 that determines how to route calls for a particular user. For example, the call routing function 14 may cause an incoming call to be routed to the callee's telephone 20, the telephone 22 of the callee's assistant, a receptionist 24 or voice mail 26, to mention a few examples.

The call routing function 14 may use information from a routing table 16. The routing table 16 may include a user profile completed by the user to determine how calls should be handled in given situations. For example, calls from certain persons may be handled in a first way and calls from other persons may be handled in a second way.

The call routing function 14 may receive information from an enterprise calendar server 18 in one embodiment. In general, the call routing function 14 receives calendar information for that user. Thus, the call routing function 14 can correlate the user's preset profile, stored in the routing table 16, with the user's actual current activities as represented by the calendar information. The calendar information may be stored, for example, on the enterprise calendar server 18 in one embodiment or in association with personal information management (PIM) software in another embodiment.

In other embodiments, the call handling system 12 may be resident on the user's telephone and the enterprise calendar server 18 may be queried to provide activity information. The activity information may then be maintained on the user's telephone 20. The activity information may be consulted, as needed, by the call routing function 14.

In a system 12 that is not based in an enterprise context, the calendar information may be the user's conventional calendar software. In such case, the calendar software may be included on the user's telephone 20 or on a processor-based system that integrates computer functionality with telephone functionality, in one embodiment. Such processor-based systems may include a telephone coupled personal computer or personal digital assistant, to mention two examples.

As an example of the application of the call routing function 14, a user may indicate that when the user is in a meeting, his or her calls may be handled in a certain fashion. The call routing function 14 can determine from the server 18, in one embodiment, when the user is in a meeting.

Figure 2:
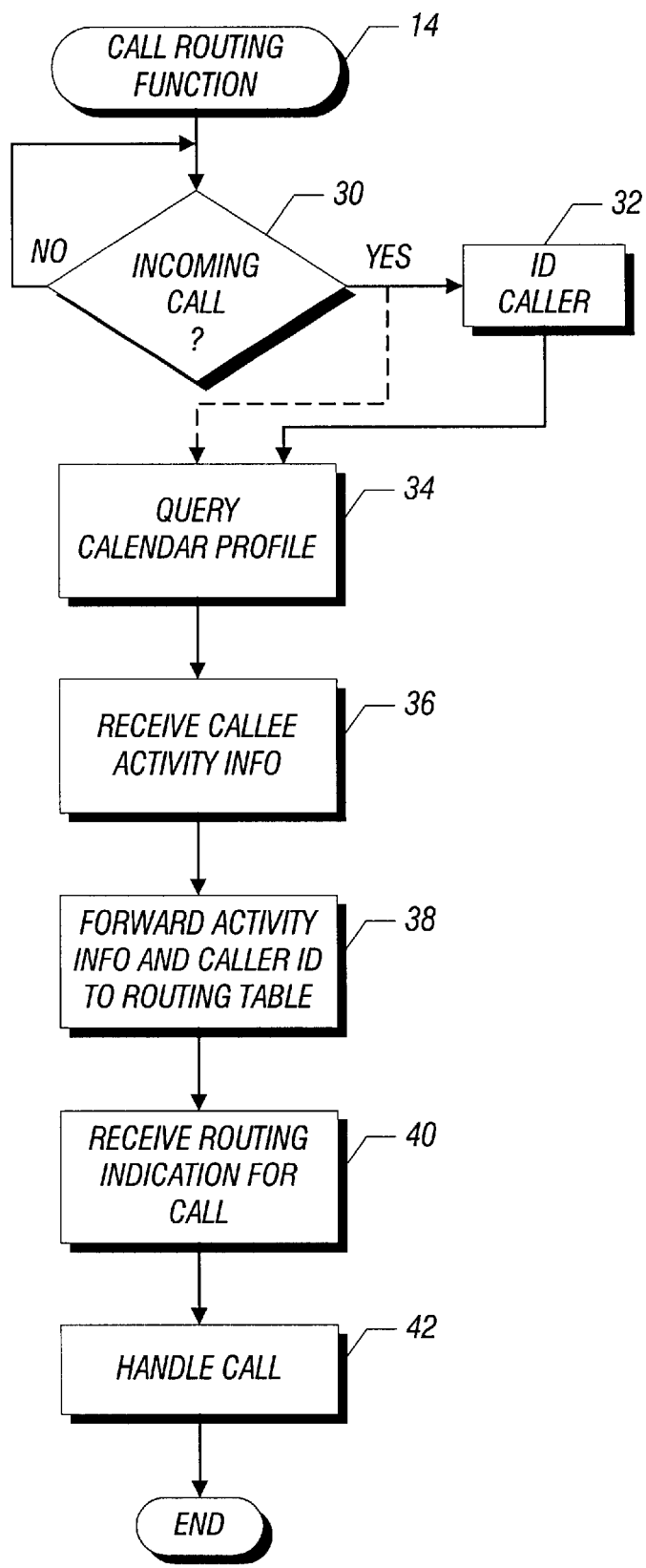
FIG. 2 is a flow chart for software in accordance with one embodiment of the present invention.

Turning next to FIG. 2, the call routing function 14 may begin by detecting an incoming call as indicated in diamond 30. In one embodiment, when an incoming call is detected, the identity of the caller may be determined as indicated in block 32. In such an embodiment, the caller identity may be obtained from a caller identification device (CID) as one example. As still another example, the caller's identity may be confirmed using a corporate address book server to insure that the identity of the caller is correct and to determine the caller's group or other organizational affiliation. In some embodiments, the caller identity information may not be necessary.

Next, the function 14 queries a calendar profile. The calendar profile may be acquired, as needed, from a enterprise calendar server 18 or may be periodically pre-acquired and stored in association with the call routing function 14 in another embodiment. Thus, the call routing function 14 may determine what the user is doing at the time that the call arrives as indicated in block 36. The function 14 then forwards the activity information from calendar profile and the caller identification information, if available, to the routing table 16 as indicated in block 38.

The call routing function 14 receives the routing indication for the call from the table 16 in one embodiment. In other words, the routing table 16 may apply (as a subroutine for example) the user's profile or predetermined selections to the information obtained about the incoming call and the user's currently calendared activity. Once the routing indication for the call is received, as indicated in block 40, the call routing function 14 may handle the call appropriately, as indicated in block 42.

Figure 3:
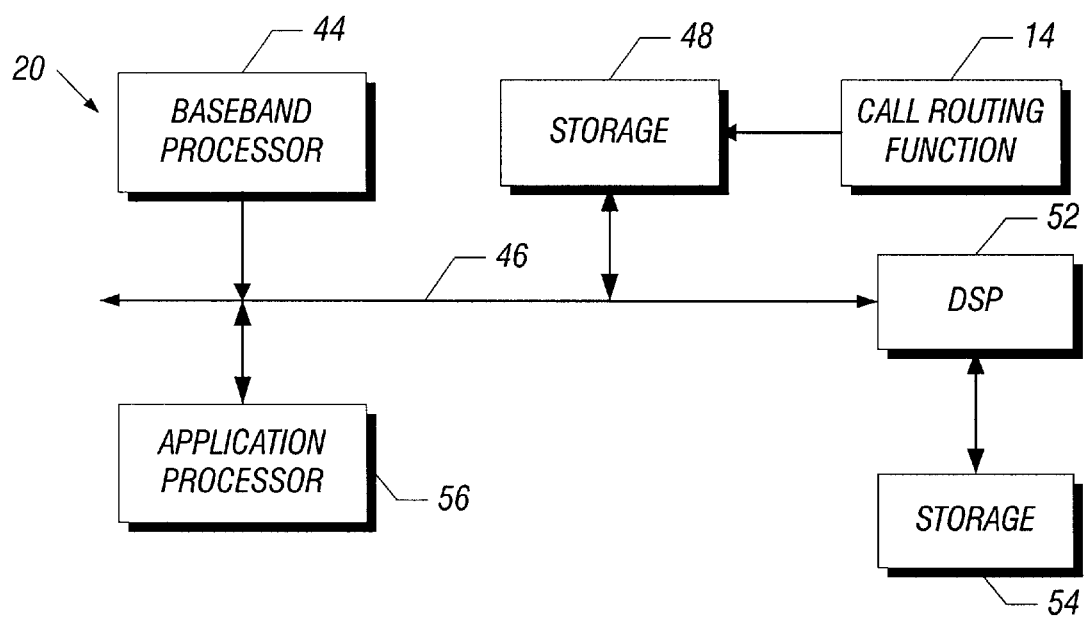
FIG. 3 is a schematic depiction of a telephone in accordance with one embodiment of the present invention.

In some embodiments, the call routing function 14 may be implemented in routing software, enterprise server systems, in PBX systems, or in conventional telephones to mention a few examples. FIG. 3 illustrates an embodiment in which the routing function 14 is integrated into a cellular telephone 20. In this case, the cellular telephone 20 may include a baseband processor 44 coupled over a bus 46 to storage 48. The storage 48 may, in one embodiment, store the call routing function 14.

The bus 46 may also be coupled to a digital signal processor (DSP) 52 that may include its own storage 54. In addition, a separate application processor 56 may be provided. In some embodiments, the application processor 56 may execute the call routing function 14. In embodiments with only one processor, that single processor may operate the call routing function 14.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   periodically obtaining information from calendar software about a user activity;
   storing the information from the periodic obtaining of the calendar software;
   obtaining information about the user's call handling profile; and
   using said stored information and said profile information to handle an incoming telephone call.

2. The method of claim 1 including obtaining information about the identity of a caller and using that information together with the activity and profile information to handle a telephone call.

3. The method of claim 1 wherein obtaining information from calendar software includes obtaining information from an enterprise calendar server.

4. The method of claim 1 wherein obtaining information from calendar software includes obtaining information from personal information management software.

5. The method of claim 1 including routing an incoming call differently depending on the user's activity as determined from the calendar software.

6. The method of claim 1 wherein obtaining information about the user's call handling profile includes obtaining information about how a user wishes to handle incoming calls from a particular caller.

7. The method of claim 6 wherein obtaining information about the user's call handling profile includes determining how to notify the user of a call from a particular caller.

8. The method of claim 6 wherein obtaining information about the user's call handling profile includes determining whether to automatically store the call from a particular caller in voice mail.

9. The method of claim 1 including using said activity and profile information on a telephone to handle a call.

10. The method of claim 9 including using said activity and profile information on a cellular telephone to handle an incoming call.

11. An article comprising a medium storing instructions that, if executed, enable a processor-based system to:
    periodically obtain information from calendar software about a user activity;
    store said information;
    obtain information about the user's call handling profile; and
    use said stored activity information and profile information to handle an incoming telephone call.

12. The article of claim 11 further storing instructions that enable the processor-based system to obtain information about the identity of a caller and use that information together with the activity and profile information to handle a call.

13. The article of claim 11 further storing instructions that enable the processor-based system to obtain information from an enterprise calendar server.

14. The article of claim 11 further storing instructions that enable the processor-based system to obtain information from personal information management software.

15. The article of claim 11 further storing instructions that enable a processor-based system to route an incoming call differently depending on the user's current activity as determined from the calendar software.

16. The article of claim 11 further storing instructions that enable the processor-based system to use the activity and profile information on a telephone to handle a telephone call.

17. The article of claim 16 further storing instructions that enable the processor-based system to use the activity and profile information on a cellular telephone to handle an incoming call.

18. A system comprising:
    a processor; and
    a storage coupled to said processor storing instructions that, if executed, enable the processor to periodically obtain information from calendar software about a user's activity, store said information, obtain information from the user's call handling profile, and use said stored activity and profile information to handle an incoming telephone call.

19. The system of claim 18 wherein said system is a telephone.

20. The system of claim 18 wherein said system is a cellular telephone.

21. The system of claim 18 wherein said system is part of an enterprise telephone call handling system.

22. The system of claim 18 wherein said storage stores instructions that obtain information about the identity of a caller and use that information together with activity and profile information to handle a telephone call.

* * * * *